United States Patent [19]

Ikedo

[11] 4,340,952
[45] Jul. 20, 1982

[54] AUTOMATIC DISC LOADING MECHANISM

[75] Inventor: Yuji Ikedo, Tokorozawa, Japan

[73] Assignee: Pioneer Electronic Corporation, Tokyo, Japan

[21] Appl. No.: 187,896

[22] Filed: Sep. 17, 1980

[30] Foreign Application Priority Data

Sep. 17, 1979 [JP] Japan .................................. 54-119706
Sep. 17, 1979 [JP] Japan .................................. 54-119709

[51] Int. Cl.³ .............................................. G11B 17/04
[52] U.S. Cl. ...................................... 369/77; 369/191; 369/194
[58] Field of Search ................. 369/77, 191, 192, 193, 369/194, 195; 360/86, 97, 98

[56] References Cited

U.S. PATENT DOCUMENTS

| | | | |
|---|---|---|---|
| 1,334,076 | 3/1920 | Brown | 369/191 |
| 2,100,686 | 11/1937 | Collaro et al. | 369/77 |
| 2,762,626 | 9/1956 | Carlson | 369/77 |
| 2,963,296 | 12/1960 | Weise | 369/191 |
| 3,264,003 | 8/1966 | Thevenaz | 369/191 |
| 4,098,510 | 7/1978 | Suzuki et al. | 369/77 |

Primary Examiner—John W. Shepperd
Attorney, Agent, or Firm—Sughrue, Mion, Zinn, Macpeak & Seas

[57] ABSTRACT

An automatic disc loading mechanism for a disc player in which the disc is positively retained and positioning of disc at the center of the spindle of a turntable is accomplished with high accuracy. The mechanism occupies only a relatively small space. The mechanism includes a player body, turntable, disc transferring means for automatically delivering a disc to the turntable prior to the start of the reproduction operation and for automatically delivering the disc outside the player body. The disc transferring means includes clamping means for clamping the disc at its center hole portion.

13 Claims, 18 Drawing Figures

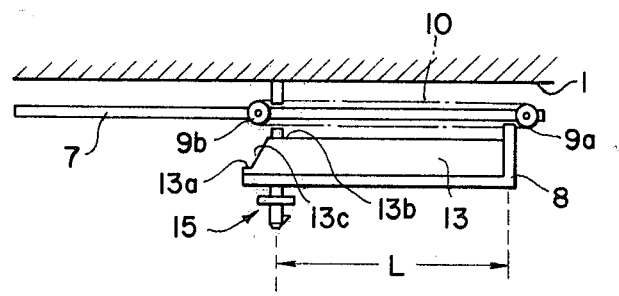
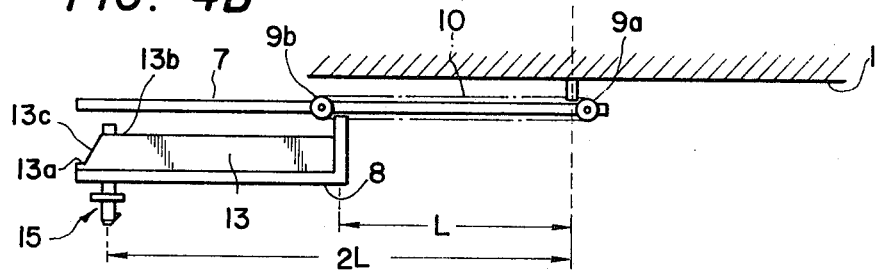
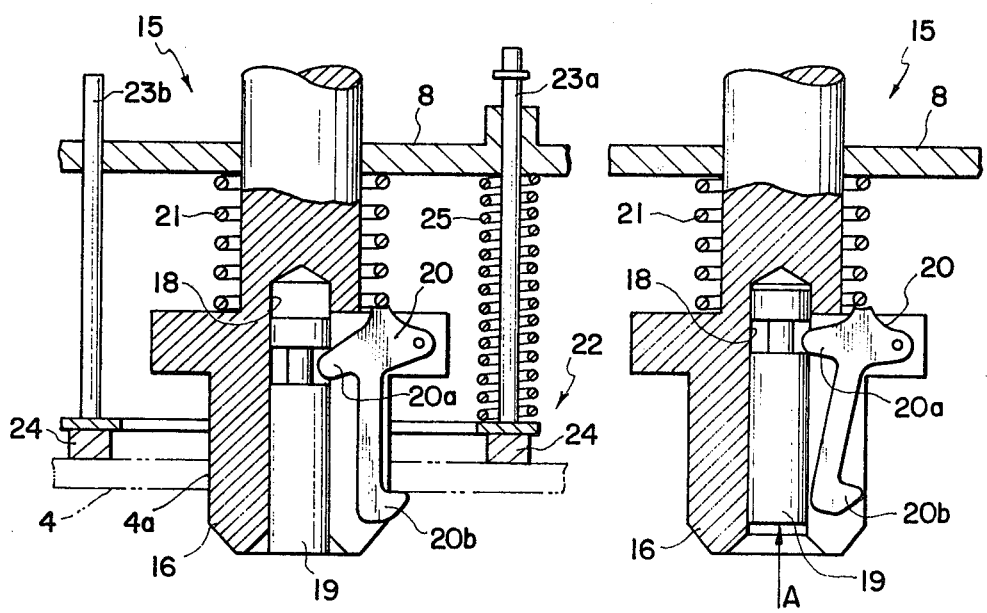
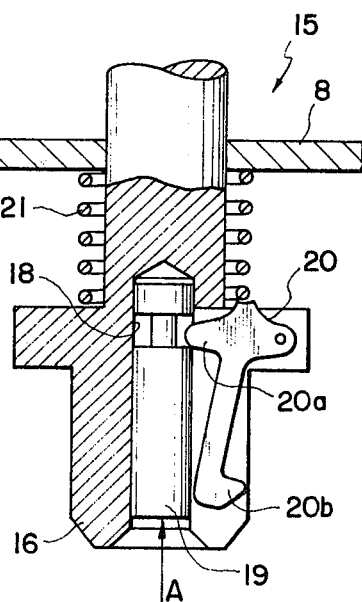

AUTOMATIC DISC LOADING MECHANISM

BACKGROUND OF THE INVENTION

The present invention relates to an automatic loading mechanism for audio or video disc players.

There have been provided audio or video disc players having a so-called auto-loading mechanism in which the disc is automatically set on the turntable before the reproduction operation is commenced and, after the reproduction operation is completed, the disc is automatically removed from the turntable.

Various types of auto-loading mechanisms have heretofore been proposed. Most mechanisms require much space for movements of discs and hence are large in size. Also, in most prior art mechanisms, the disc is held by the application of force in the radial direction of the disc during the delivery. In a mechanism in which the disc clamping device is biased by springs or the like, according to the type of disc and machining dimensional errors, the sizes of discs used differ. In some cases, this causes the discs to be clamped with excessive force during the disc delivery operation and may lead to damage of the disc. Furthermore, with the prior art mechanisms, it is very difficult to positively position the disc on the center spindle of the turntable. This makes it difficult to provide an auto-loading mechanism with a good performance. Moreover, the known prior art mechanisms are considered quite complex.

An object of the present invention is thus to provide an automatic disc loading mechanism in which the disc is positively retained and positioning of the disc at the center spindle of the turntable is accomplished with high accuracy. A further object of the invention is to provide such a mechanism which can be miniaturized.

BRIEF DESCRIPTION OF THE DRAWINGS

FIGS. 4A and 4B are cross-sectional views showing the transferring device of FIG. 3 in a retracted state and in a projected state, respectively;

FIGS. 5A and 5B are cross-sectional views showing an example of a clamping device used with the mechanism of FIG. 1;

SUMMARY OF THE INVENTION

Figure 1:
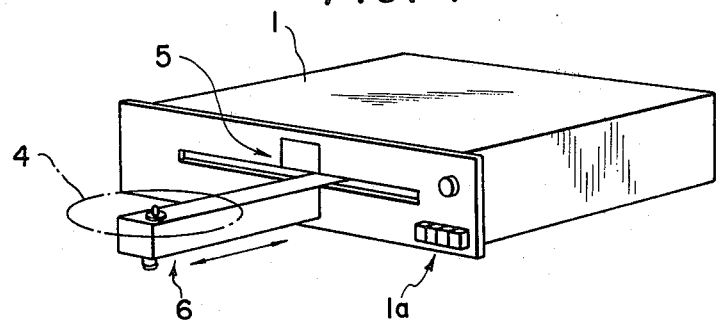
FIG. 1 is a perspective view showing a first preferred embodiment of an automatic disc loading mechanism of the invention.

In accordance with these and other objects of the invention, there is provided an automatic disc loading mechanism for a disc player including a player body, a turntable, disc transferring means for automatically delivering a disc to the turntable and automatically delivering or removing the disc to position outside the player body with the disc transferring means including clamping means for clamping the disc at a center hole position thereof. The clamping means preferably includes a clamping spindle freely movable in substantially a vertical direction to a plane including the surface of the turntable and which is insertable into the center hole of the disc, a projecting member projectable beyond an outer wall of the clamping means, and drive means for driving the projecting member in a projecting direction thereof. The projecting member is driven to clamp the disc when a clamping spindle inserted into the center hole of the disc is lifted. The clamping means is adapted to clamp the disc in cooperation with the projecting means. Preferably, the projecting member is rotatably mounted in the clamping spindle. The drive means includes a slidable member slidable in an axial bore formed in the clamping spindle and slidable in response to a predetermined outside force to rotate the projecting member in a predetermined direction. Biasing means is provided for biasing the projecting member in a direction opposite to the predetermined direction.

Objects of the invention are also met by an automatic disc loading mechanism for a disc player including a player body, a turntable, transferring means for automatically delivering the disc to the turntable and automatically delivering the disc outside the player body. The disc transferring means include a first longitudinal loader slidable on the player, a second longitudinal loader movably mounted on the first longitudinal loader with respect to the first longitudinal loader, retaining means mounted on the second longitudinal loader for retaining the disc, and means for moving the first longitudinal loader and the second longitudinal loader mounted thereon.

Yet further, the objects of the invention are met by an automatic disc loading mechanism for a disc player including a player body, a turntable, disc transferring means for automatically delivering a disc to the turntable and automatically delivering the disc outside the player body, disc mounting means on which the disc is mountable, disc transferring means for transferring the disc including a clamping spindle movable in substantially a vertical direction to a plane including a surface of the turntable and for clamping the disc. The clamping spindle is inserted into a center hole of the disc on the disc mounting means when the disc is delivered. The disc mounting means include a spindle insertable into the center hole of the disc and mounted thereon and retaining means for retaining the spindle lowered by a depressing force by lowering the clamping spindle at a position removed from the center hole of the disc.

Moreover, the objects of the invention are met by an automatic disc loading mechanism for a disc player including a player body, a turntable, disc transferring means for automatically delivering a disc to the turntable and automatically delivering the disc outside the player body, disc mounting means on which the disc is mountable and having a spindle insertable into a center hole of the disc. The disc transferring means include a clamping spindle movable in the axial direction of the spindle and insertable into the center hole of the disc, a movable member slidable in an axial bore formed in the clamping spindle, and a rotable member having a hook portion projectable beyond an outer wall of the clamping spindle and rotable in the clamping spindle and which is biased in the projecting direction of the hook portion and being rotatingly driven by the slidable member. The slidable member slides by application thereto of a depression force due to abutment against the spindle when the clamping spindle is lowered so that the rotable member is rotatingly driven in the projecting direction when the hook portion is retracted.

Still, further, the objects of the invention are met by an automatic disc loading mechanism for a disc player including a player body, a turntable, disc mounting means projectable from the player body, and disc transferring means for automatically delivering a disc to the turntable and for automatically delivering the disc outside the player body with the disc mounting means being movable automatically into and outside of the player body during disc delivery. Means is provided for preventing movement of the disc mounting means during reproduction. The disc mounting means includes a movable member which moves in accordance with the movement of the disc transferring means and first and second engagement means engagable with the movable member during disc projection and disc retraction, respectively, the disc mounting means includes means for detecting a state in which a disc mounting thereon is transferred to the disc transferring means and for producing a signal indicative of the presence of a transferring period, and the first engagement means is engaged with the movable member in response to the signal.

Even further, the invention can be practiced by an automatic disc loading mechanism for a disc player including a player body, a turntable, disc transferring means for automatically transferring a disc to the turntable and automatically delivering the disc outside the player body with the disc transferring means including a first longitudinal loader movable into the player body, a first pair of pulleys mounted on the first longitudinal loader, a first wire a part of which is secured to the player body and laid over the first pair of pulleys, a second longitudinal loader slidable on the first longitudinal loader and connected to a rear end to the first wire, a clamping spindle movable up and down and mounted at a front end of the second longitudinal loader and inserted into the center hole of a disc to thereby clamp the disc, a second pair of pulleys mounted on the first longitudinal loader, a second wire laid over the second pulleys, an up and down cam secured to the second wire at a rear end thereof and engaged with the clamping spindle at a front end thereof to thereby move up and down, and a rotatable lever rotatably mounted on the player body and secured at one end to the second wire to be thereby selectively movable.

In any of these embodiments, the disc mounting means may include a longitudinal slidable member slidable in the radial direction of the turntable and a spindle insertable into a center hole of the disc informed on a front portion of the longitudinal slidable member. The disc transferring means may include to any of these cases a longitudinal slidable members slidable in the radial direction of the turntable and a clamping spindle formed at the front portion of the longitudinal slider member and movable in a direction substantially vertical to a plane including a surface of the turntable and insertable into a center hole of the disc on the disc mounting means during a disc delivery operation to thereby clamp the disc.

DESCRIPTION OF THE PREFERRED EMBODIMENTS

The present invention will hereinafter be described with reference to the drawings.

Figure 2:
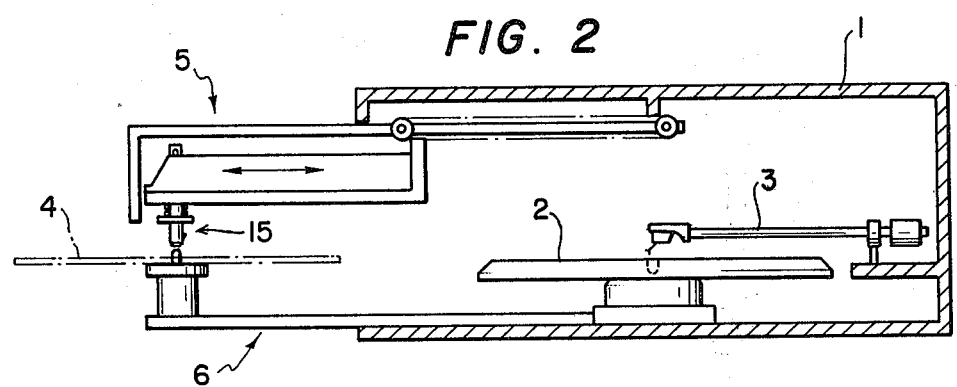
FIG. 2 is schematic cross-sectional view of the mechanism of FIG. 1.

FIG. 1 is a perspective view showing a first preferred embodiments of a record player provided with an automatic loading mechanism. FIG. 2 is a schematic cross-sectional side view of the player. In the drawings, a turntable 2 and a pick-up arm 3 are suitably mounted on a player body 1. Included also are a record disc transferring device 5 for automatically transferring a record disc 4 and record disc carrier 6 for holding a record disc 4 which are automatically or manually retractable into or projectable from the player body 1.

Figure 3:
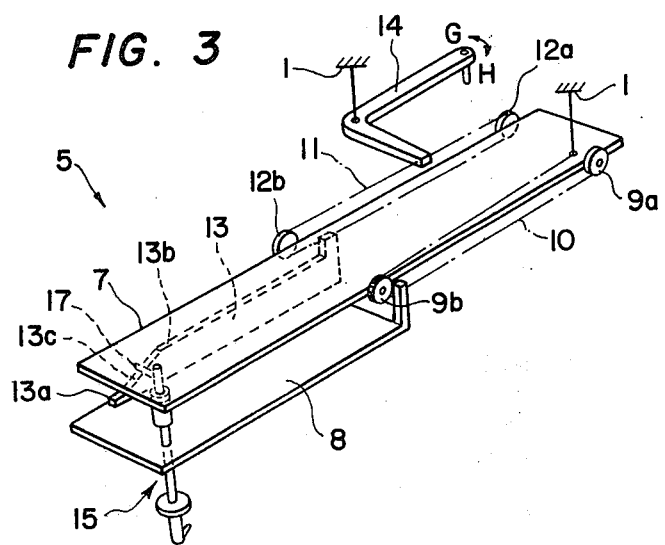
FIG. 3 is a schematic perspective view of an example of a disc transferring device used with the mechanism of FIG. 1.

FIG. 3 is a schematic perspective view of an example of the disc transferring device 5. A multispeed mechanism is formed by a first loader 7 slidable with respect to the player body 1 and a second loader 8 slidable with respect to the first loader 7. Specifically, a pair of pulleys 9a and 9b are rotatably mounted on one side of the first loader at a fixed spacing, a synchronizing wire 10 is laid over the pulleys 9a and 9b and is attached to the player body 1 at a position in the vicinity of one of the pulleys 9a and 9b and to the second loader 8 at a position in the vicinity of the other of the pulleys 9a and 9b. A pair of pulleys 12a and 12b on which a differential wire 11 is laid are rotatably mounted on the other side of the first loader 7, and up-and-down cam 13 having flat cam surfaces 13a and 13b and a slant cam 13c surface integral therewith is attached at the other end to the differential wire 11. Further, a rotatable lever 14 is attached at one end to the differential wire 11 for driving the differential wire 11. A clamping device 15 for clamping the record disc 4 in its center hole during a disc delivery operation is movable up and down through the second loader.

With L being the distance from the position at which the second loader 8 is attached to the wire 10 in the vicinity of the pulley 9a to the position at which the player body 1 is attached to the wire 10 in the vicinity of the pulley 9b as shown in FIGS. 4A and B, when the transferring device 5 is moved from the retracted state (FIG. 4A) to the projected state (FIG. 4B), the clamping device 15 is moved twice a distance L of the movement of the first loader 7. Thus, the clamping device 15 is moved at twice the speed of the first loader 7 thereby undergoing a multispeed movement. Therefore, with this multispeed mechanism, although the movements of movable parts disposed in the player body 1 are short, it is possible to obtain a sufficient stroke for the clamping device 15 to thereby provide a desirably small player body.

FIG. 5A is a partial cross-sectional view showing an example of clamping device 15 including a clamping spindle 16 movable up and down through the second loader 8. The spindle 16 has a lower end portion which is insertable into the center hole 4a of the record disc 4 and at an upper end portion thereof the spindle has an engagement pin 17 as shown in FIG. 3. The pin 17 is moved up and down on the flat cam surface 13a, the slant cam surface 13c and the other flat cam surface 13b in response to the horizontal movement of the up and down cam 13. An axial hole 18 opening downwardly in the clamp spindle 16 is formed. Into the hole 18 is slidably inserted a slidable member 19 which has the form of a rod. Furthermore, in the clamping spindle 16 is rotatably provided a rotatable member 10 having an engagement portion 20a engaged with a recess in the slidable member 19 and a hook portion 20b projectable from the outer periphery of the clamping spindle 16. The rotatable member 20 is biased to rotate counterclockwise as viewed in FIG. 5A, that is in the direction such that the hook portion 20b is projected outwardly by a coiled spring 21 urging the spindle 16 downwardly. The hook portion 20b of the rotatable member 20 serves to clamp the record disc 4. In the normal state shown in FIG. 5A, the hook portion 20b is projected from the outer wall of the clamping spindle 16 by the force of the spring 21. On the other hand, in the transient state for clamping, as shown in FIG. 5B in which the force designated by an arrow A acts on the slidable member 19, the rotatable member 20 is rotated clockwise so that the hook portion 20b is retracted into the spindle 20b. In the state where the hook portion 20b is retracted, the clamping spindle 16 is readily inserted into the center hole 4a without damaging the disc 4. The clamping device 15 includes a stabilizer 22 for positively clamping the disc 4 co-acting with the hook portion 20b while preventing oscillation of the disc 4. For example, the stabilizer 22 can be constructed of a pair of guide posts 23a and 23b slidable up and down and supported by the second loader 8, pads 24 provided at the lower ends of the guide posts 23a and 23b and a coiled spring 25 biasing the pads 24 and the guide posts 23a and 23b downwardly with respect to the second loader 8.

Figure 6:
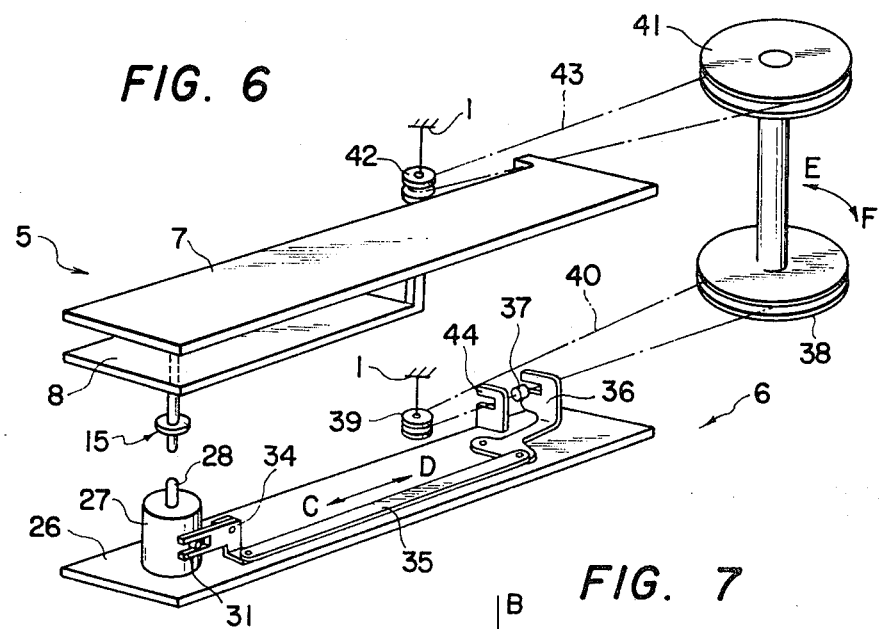
FIG. 6 is a schematic perspective view of an example of a record disc carrier used with the mechanism of FIG. 1.
Figure 7:
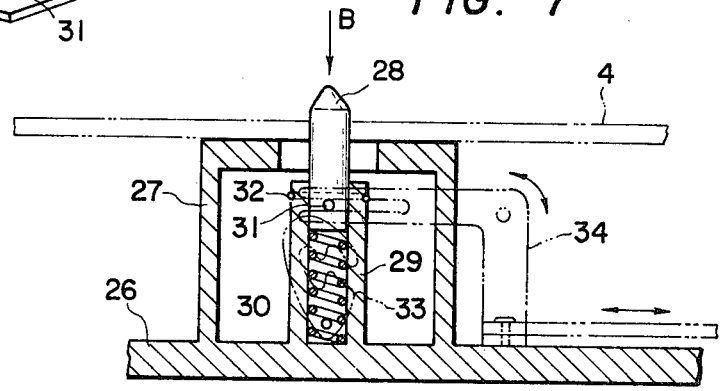
FIG. 7 is a cross-sectional view of a spindle used in the mechanism of FIG. 1.

FIG. 6 is a schematic perspective view showing an example of the record disc carrier 6 and also the disc transferring device 5. In the drawing, a slider 26 is slidingly movable in the radial direction of the turntable shown in FIG. 2 and projectable from the player body 1. A mounting support 27 on which the disc 4 is temporarily mounted is secured to the front end portion of the slider 26. The disc mounting support 27 includes a spindle 28 insertable into the center hole 4a of the record disc 4 for positioning the disc 4 suitably. As shown in FIG. 7, the spindle 28 is supported in such a way as to be movable up and down by a guide 29 in the disc support 27 and is biased upwardly by a coil spring 30. An engagement pin 31 is provided on the peripheral wall of the spindle 28 and is in abutment with an annular ring 32 secured to an upper portion of the guide 29 to thereby restrict the upward movement of the spindle 28. Also, in the mounting disc support 27, a ratchet plate 33 is formed as a retainer which retains the spindle depressed by an outside force in the direction designated by an arrow B to a position far from the center hole 4a of the record disc 4 by action of the engagement pin 31 provided on the outer wall of the spindle 28, that is, a position where the top portion of the spindle 28 is retracted under the upper surface of the disc support 27. Every time the outside force B acts on the spindle 28, the spindle 28 is repeatedly retained and released by the ratchet plate 33 in a push-and-push operation. The up and down movement of the spindle 28 is transmitted to a crank 34 which is rotatable in the vertical plane and is engaged with the engagement pin 31 away from the disc support 27. The rotational movement of the crank 34 is transmitted through a connecting link 35 to a clutch plate 36 serving as a first engagement device rotatable in the horizontal plane. The clutch plate 36 is selectively engaged with an engagement member 37 acting as a slider drive device for driving the slider 26 in response to the up and down movement of the spindle 28. More specifically, the clutch plate 36 is, when the spindle is positioned at the upper limit position, moved in the direction C of the connecting link 35 and is retained at a disengaged position while, when the spindle 28 is positioned at the lower limit position, the clutch plate 36 is moved in the direction D of the connecting rod 35 and is retained at an engaged position. The engagement member 37 is attached to a drive wire 40 which is laid over a drive pulley 38 driven by a motor (not shown) and an idler pulley 39. Thus, the slider drive device is composed of the engagement member 37 and the pulleys 38 and 39. The drive source of the slider drive device is used commonly with the loader drive device made up of a drive pulley 41, an idler pulley 42 and a drive wire 43 secured to the first loader 7 and laid over the pulleys 41 and 42. Therefore, the engagement member 37 is moved synchronously with the movement of the first loader 7.

The engagement member 37 is engaged with the clutch plate 36 prior to engagement during the rotation of the drive pulley 38 in the direction of an arrow E to thereby move the slider 26 so that the disc mounting device is positioned inside the player body 1. On the slider 26 is mounted an engagement plate 44 serving as a second drive device. The engagement member 37 is, when the drive pulley 38 is rotated in the direction of an arrow F, engaged with the engagement plate 44 so that the disc carrier 6 is automatically projected out of the player body 1.

Figure 8:
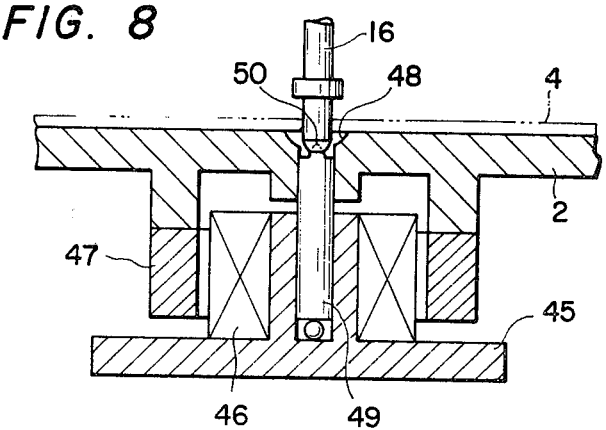
FIG. 8 is a cross-sectional view showing an example of a turntable used in the mechanism of FIG. 1.

FIG. 8 is a cross-sectional view showing an example of the turntable 2 which is, for instance, rotated by a direct drive type motor including a stator 46 secured to a stator base 45 and a rotor 47 coupled to the turntable 2. In the central portion of the turntable 2 a hole 48 is provided into which the spindle 16 is insertable. An outer shaft 49 is provided at the top thereof with a projection 50 which is to be disposed in the bottom of the hole 48. The projection 50 is in abutment with a lower end of the slidable member 19 disposed within the clamping spindle 16 which lowers when the disc 4 is set on the turntable by the disc transferring device 5 so that the hooked portion 20b is retracted into the clamping spindle 16 to release the disc 4. Also, the clamping spindle 16 serves as a centering spindle for the turntable 2 during disc reproduction while inserted into the hole 48 of the turntable 2. Thus, since the clamping spindle 16 is used commonly as a spindle of the turntable 2, the construction of the turntable 2 is much simplified. In particular, such a construction is very effective for direct drive type turntables in which structural modifications are difficult.

The operation of the thus constructed automatic loading mechanism will now be described.

In order to start the reproduction of a disc, the disc carrier 6 is manually drawn out of the player body as shown in FIG. 1. Then, the disc 4 is set on the disc support 27. Thereafter, a start button of an operational section 1a provided on the player body 1 is depressed so that, as shown in FIG. 3, the rotatable lever 14 is rotated in the direction of the arrow G by drive means (not shown) and the up and down cam 13 is moved leftwardly. As a result, the clamping spindle 16 positioned in the central hole of the turntable 2 as shown in FIG. 8 is lifted upwardly. Subsequently, the drive pulley 41 is moved in the direction of the arrow F as shown in FIG. 6 so that the first loader 7 attached to the drive wire 43 is moved forwardly. At this time, since the synchronizing wire 10 coupled to the first loader 7 is attached to the player body 1, the second loader 8 is moved at twice the speed of the first loader 7. The second loader 8 is moved twice the distance of the first loader 7, that is, a distance 2L, whereupon it reaches the front end, as shown in FIG. 4B. The distance is determined such that the clamping spindle 16 provided at the front end portion of the second loader 8 is positioned just above the spindle 28 at the most forward position of the second loader 8. During this movement, since the rotatable lever 14 is not driven, the up and down cam is moved together with the second loader 8 but the clamping spindle 16 is not driven at all. When the disc transferring device 5 reaches the forward-most position, the rotatable lever 14 is driven in the direction H shown in FIG. 3 and the up and down cam 13 is moved rightward to thereby start the clamping operation.

Figure 9A:
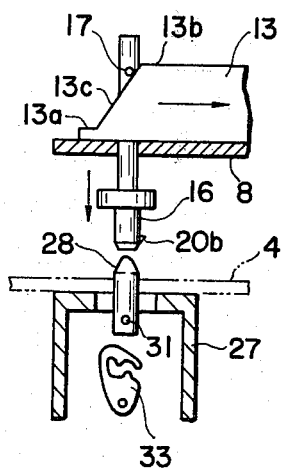
FIGS. 9A-9C and 10A-10C are cross-sectional views of a spindle used in the mechanism of FIG. 1 in various positions.
Figure 9B:
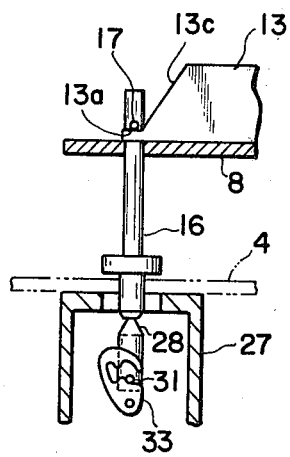
Figure 9C:
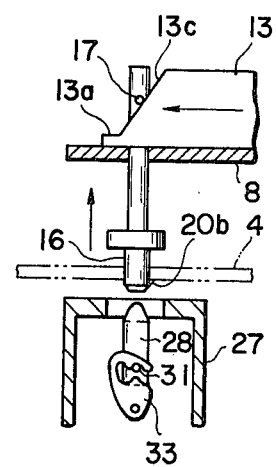

By the rightward movement of the up and down cam 13, the engagement pin 17 of the clamping spindle 16, which abuts with the flat surface 13b of the cam 13, moves along the slant surface 13c. As a result, the clamping spindle 16 is moved downwardly and abuts and depresses the spindle 28. At this time, since a force in the direction A as shown in FIG. 5B is applied to the slidable member 19 positioned in the clamping spindle 16 by the spindle 28, the rotatable member 20 is rotated in the clockwise direction to thereby cover the hook portion 20b in the clamping spindle 16. Accordingly, the clamping spindle 16 is readily inserted into the center hole 4a of the disc 4 without damage to the disc 4 on reaching the bottom dead center position shown in FIG. 9B. Since, when the clamping spindle 16 reaches the bottom dead center position, the cam 13 is moved leftward as shown in FIG. 9C, the engagement pin 17 of the clamping spindle 16 is moved from the flat surface 13a to the slant surface 13C so that the clamping spindle can begin to be lifted upwardly. In this case, since the spindle 28 is interlocked by the engagement between the engagement pin 31 provided on the outer wall of the spindle 28, the clamping spindle 28 is covered upon the upward movement of the clamping spindle 16. For this reason, the slidable member 19 in the clamping spindle 16 is not depressed so that the rotatable member 20 is rotated counterclockwise by the biasing force of the spring 20. As a result, the hooked portion 20b thereof is projected out of the outer wall of the spindle 16 to thereby clamp the disc 4. Since at this time, the hook portion 20B clamps the disc 4 and coacts with the stabilizer 22 as shown in FIG. 5A, although only a single hook is provided, oscillation of the disc 4 is prevented and the disc 4 is firmly held. Also, since the spindle 28 is retained at the lower position by cooperation between the engagement pin 31 and the crank 34, the connecting link 35 is moved in the direction D shown in FIG. 6. In compliance with this movement of the connecting link 35, the clutch plate 36 is moved to a position where it is engageable with the engagement member 37.

After the completion of the lifting movement of the clamping spindle 16, the drive pulley 41 is rotated in the direction E shown in FIG. 6, the first and second loaders are retracted in the order opposite to that described above, and the disc 4 clampled by the clamping device 15 is transported to the turntable 2. At the same time, since the drive pulley 38 is also rotated, the engagement member 37 attached to the drive wire 40 is engaged with the clutch plate 36 to thereby move the slider 26. Therefore, the disc carrier 6 is automatically positioned within the player body 1. When the clamping spindle 16 clamping the disc 4 is positioned just above the center hole 48 of the turntable 2, the rotating lever 14 is rotated in the direction of the arrow H shown in FIG. 3 and the cam 13 is moved rightwardly by the movement transmitted through the differential wire 11. Accordingly, the clamping spindle 16 is lowered and inserted into the central hole 48 of the turntable 2 and simultaneously therewith the disc 4 is positioned on the turntable. At this time, the tip end of the clamping spindle 16 is in abutment with the projection 50 formed in the center hole 48 so that the slidable member encased in the clamping spindle 16 is depressed thereinto. As a result, the hook portion 20b is retracted into the clamping spindle 16 to release the clamping of the disc 4. Thereafter, the pick-up arm 3 is driven by a well known automatic mechanism and record reproduction is started. During record reproduction, the clamping spindle 16 is retained in the inserted state in the center hole 48 of the turntable and thus the spindle 16 serves as a spindle for the turntable 2. During reproduction, the clutch plate 36 of the disc mounting means 6 remains engaged with the engagement member 37 whereby the manual withdrawal of the disc carrier 6 is prevented, that is, double loading of the disc 4 is positively prevented.

When reproduction is completed or an eject operation is required, the rotational lever 14 shown in FIG. 3 is rotated in the direction of the arrow G and the clamping spindle 16 is lifted by action of the differential wire 11 and the cam 13. Then, the tip of the clamping spindle 16 is engaged with the projection 50 within the center hole 48 so that the hook portion 20b is projected out of the outer wall of the clamping spindle 16 to thereby clamp the disc 4. After the clamping spindle 16 is completely lifted, the drive pulleys 38 and 41 are driven and hence the first and second loaders 7 and 8 are moved forwardly. At the same time, the slider 26 is also synchronously moved by the engagement between the engagement member 37 and engagement plate 44.

Figure 10A:
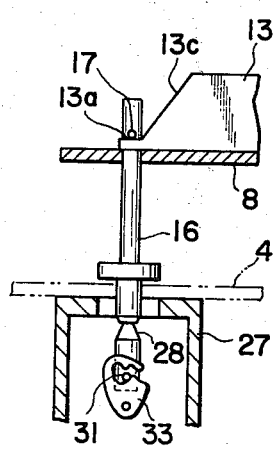
Figure 10B:
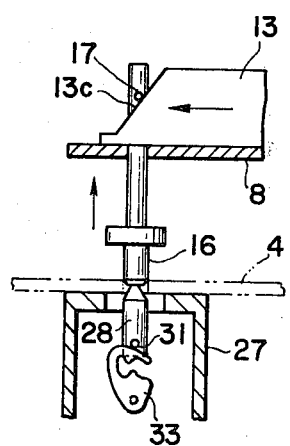
Figure 10C:
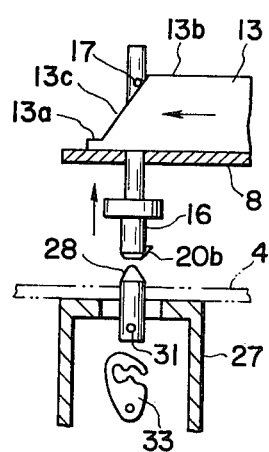

When the disc transferring device 5 and the disc carrier 6 are moved together to the forward-most position and the clamping spindle 16 and the spindle 28 are aligned, the rotating lever 14 is rotated in the direction of the arrow H whereby the clamping spindle 16 is lowered and the spindle 28 which is retained at a lower position is depressed as shown in FIG. 10A. At this time, the slidable member 19 within the clamping spindle 16 is moved upwardly. Accordingly, the hook portion 20b is moved inside the clamping spindle 16. Also, since the spindle 28 is depressed to release the interlock of the ratchet plate 33, when the clamping spindle 16 is lifted, the slidable member 19 in the clamping spindle 16 is depressed thereinto and lifted. Accordingly, since the clamping spindle 16 is lifted with the hook portion 20b positioned therein, the clamping spindle 16 is continously lifted with the disc 4 on the provisional disc support 27. By release of the lock on the spindle 28, the clutch plate 36 is rotated by the crank 34 and the connecting link 35 to a position where the clutch plate 36 is disengaged from the engagement member 37.

After the clamping spindle 16 is completely lifted, the drive pulleys 38 and 41 are driven in the direction of the arrow E indicated in FIG. 6 and the disc transferring device 5 is moved with the player body 1. Also, the clutch plate 36 is disengaged from the engagement member 37 as described above and hence the plate 36 is not retracted. The disc 4 is thus maintained supported on the disc mounting means 6. After the disc transferring device 5 is retracted into the player body 1, the disc can be removed by the user after which the disc mounting device 6 is manually depressed into the player body 1 to thereby complete the operation.

In the specific embodiment described above, outward movement of the disc mounting device 6 before the disc is manually positioned and the retraction operation of the disc carrier after a reproduction operation has been completed are achieved manually. However, these operations can, of course, be implemented automatically if desired. Moreover, it is not always required to provide a disc carrier as described. For example, if the front end portion of the disc transferring device 5 is made of transparent material in order to view the clamping device 15 portion and an outside force is applied manually to the clamping spindle slidable member 19 to clamp the disc 4, it is possible to dispense with the disc carrier.

Figure 11A:
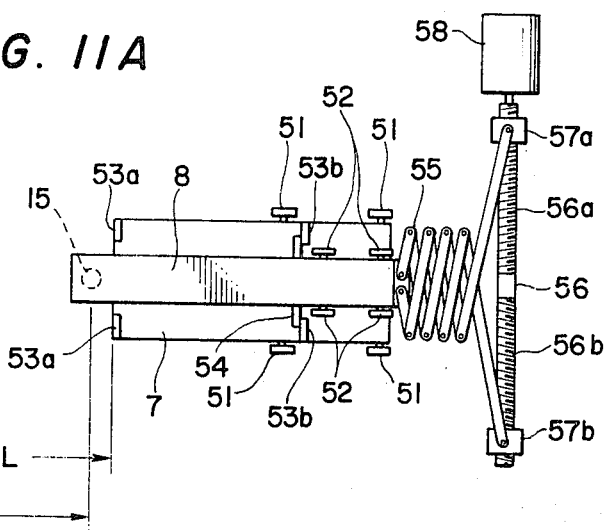
FIGS. 11A and 11B are schematic top plan views of a transferring device used in the mechanism of FIG. 1.
Figure 11B:
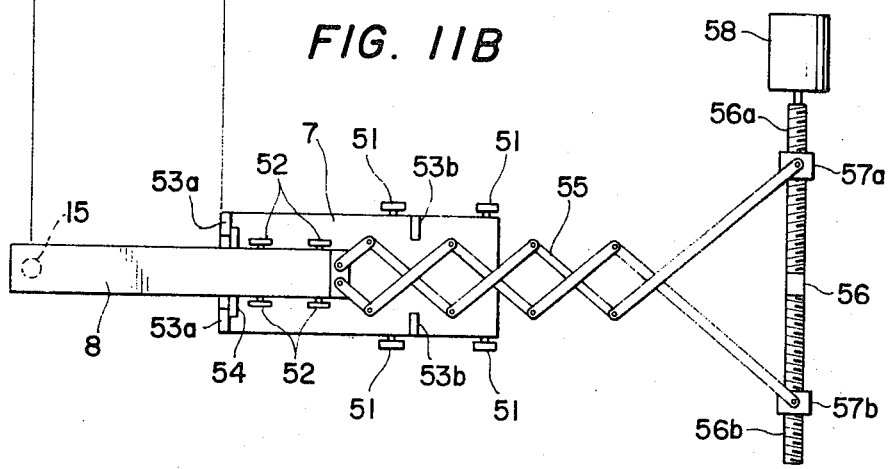

Another example of a multi-speed mechanism of the present invention will be described with reference to FIGS. 11A and 11B. FIGS. 11A and B are schematic top plan views of a disc transferring device in which a modified multispeed mechanism is used. A first loader 7 is movably mounted on the player body 1 through the rollers 51 and a second loader 8 is movably mounted on the first loader 7 through rollers 52. Abutments 53a and 53b mounted on the first loader 7 are spaced a predetermined distance L and abutments 54 cooperating with the abutments 53a and 53b are mounted on the second loader 8 to define the movement of the second loader 8 relative to the first loader 7.

A pantograph or collapsible arm 55 is provided at a rear end of the second loader 8. The pantograph has a pair of threaded engagement members 57a and 57b which are threadedly engaged with screw portions 56a and 56b having opposite screw thread directions and which are formed on the shaft 56 so that, when the shaft 56 is rotated in one direction, the engagement members 57a and 57b are moved in the opposite direction to contract or extend the pantograph or collapsible arm 55. In the same manner as in the previously-described embodiment, the clamping device 15 is provided at a front end of the second loader.

The retracted state of the disc transferring device 5 is shown in FIG. 11A. When the rotational shaft 56 is rotated in a predetermined direction by a motor 58, the collapsible arm 55 extends to drive the second loader 8 leftwardly so that the abutments 54 are moved a distance L on the first loader 7 until the abutments 54 abut against the abutments 53a. Further, the first loader 7 is moved by the collapsible arm 55 through the second loader 8 and the second loader 8 is moved a distance 2L with respect to the player body 1. Accordingly, the clamping means 15 formed at the front portion of the second loader is moved twice the distance of the first loader 7 as shown in FIG. 11B. Also when the transferring device 5 is retracted into the player body, the motor 58 is rotated in the opposite direction so that the arm 55 is contracted to move the second loader 8 rightwardly. Further, when the abutments 54 are in abutment with the abutments 53b, the first loader is moved to the position shown in FIG. 11A. In the above described embodiment, if the number of loaders is increased, it is possible to further amplify the movement of the clamping means 15 relative to the basic loader.

As described above, according to the automatic loading mechanism of the present invention, since the disc is clamped at the center hole thereof, the invention is applicable to any kind or any size record disc and it is possible to clamp the disc with a constant force for retaining the disc. Also it is easy to positively position the center hole of the any disc accurately at the center of the turntable. Furthermore, since the movements of the moving components used are relatively short, the mechanism may be miniaturized. And, since the weights of the moving parts are light, it is easy to well balance the overall mechanism and hence only a small amount of energy is required for the driving parts. Therefore, using the above-described automatic loading mechanism, the player body can be made compact making it suitable for use in a system including a compact amplifier or tuner so that good balance of the total design is provided without requiring a great deal of space.

What is claimed is:

1. An automatic disc loading mechanism for a disc player comprising a player body; a turntable; disc transferring means for automatically delivering a disc to said turntable and automatically delivering said disc outside of said player body, said disc transferring means including clamping means for clamping said disc at a center hole position thereof, said clamping means comprising a clamping spindle freely movable in substantially a vertical direction to a plane including the surface of said turntable and insertable into said center hole of said disc; a projecting member projectable beyond an outer wall of said clamping spindle; and drive means for driving said projecting member in a projecting direction, said projecting member being driven to clamp said disc when said clamping spindle inserted into said center hole of said disc is lifted, said projecting member being rotatably mounted in said clamping spindle, said drive means comprising a slidable member located in and slidable within an axial bore formed in said clamping spindle and being slidable in response to a predetermined outside force to rotate said projecting member in a predetermined direction and biasing means for biasing said projecting member in a direction opposite to said predetermined direction.

2. The automatic disc loading mechanism according to claim 1, wherein said disc transferring means is retractable into said player body.

3. The automatic disc loading mechanism for a disc player according to claim 1 further comprising disc mounting means, said disc mounting means including a longitudinal slidable member slidable in a radial direction of said turntable and a spindle which can be inserted into a center hole of said disc, said spindle being formed on a front portion of said longitudinal slidable member.

4. The automatic disc loading mechanism according to claim 1 further comprising disc mounting means for mounting said disc, said disc transferring means including first and second loaders slidable in a radial direction of said turntable and a clamping spindle formed at a front portion of said second loader and being movable relative to a plane including a surface of said turntable and being insertable into said center hole of said disc on said disc mounting means during disc delivery to thereby clamp said disc.

5. The automatic disc loading mechanism for a disc player according to claim 1 wherein during reproduction said clamping spindle is inserted into said hole of said turntable and acts as a center shaft of said turntable.

6. The automatic disc loading mechanism for a disc player according to claim 1 wherein said clamping spindle is inserted into a center hole of said turntable to thereby release disc clamping.

7. An automatic disc loading mechanism for a disc player comprising: a player body; a turntable; disc transferring means for automatically delivering a disc to said turntable and automatically delivering said disc outside of said player body; disc mounting means on which said disc is mountable and having a first spindle insertable into a center hole of said disc, said disc transferring means including a clamping spindle movable in an axial direction of said clamping spindle and insertable into said center hole of said disc; a movable member slidable in an axial bore formed in said clamping spindle; and a rotatable member having a hook portion projectable beyond an outer wall of said clamping spindle and rotatable in said clamping spindle, said rotatable member being biased in a projecting direction of said hook portion and being rotatingly driven by said slidable member, said slidable member sliding by a depression force due to abutment against said first spindle when said clamping spindle is lowered so that said rotatable member is rotatingly driven opposite to said projecting direction when said clamping spindle is lowered.

8. An automatic disc loading mechanism for a disc player comprising: a player body; a turntable; disc mounting means projectable from said player body; and disc transferring means for automatically delivering a disc to said turntable and automatically delivering said disc outside of said player body; said disc mounting means being automatically movable into and out of said player body during disc delivery; and means for preventing said disc mounting means from moving during reproduction.

9. The automatic disc loading mechanism according to claim 8 wherein said disc mounting means includes a movable member moving in accordance with movement of said disc transferring means, and first and second engagement means being engageable with said movable member during disc projection and disc retraction, respectively.

10. The automatic disc loading mechanism accordint to claim 9 wherein said disc mounting means includes means for detecting a state in which said disc mounted thereon is transferred to said disc transferring means and for producing a signal indicative of the presence of a transferring period, said first engagement means being engaged with said movable member in response to said signal.

11. An automatic disc loading mechanism for a disc player comprising: a player body; a turntable; disc transferring means for automatically delivering a disc to said turntable and automatically delivering said disc outside of said player body; said disc transferring means including a first longitudinal loader movable into said player body; a first pair of pulleys mounted on said first longitudinal loader; a first wire a part of which is secured to said player body and laid over said first pair of pulleys; a second longitudinal loader slidable on said first longitudinal loader and connected at a rear end to said first wire; a clamping spindle movable up and down and mounted at a front end of said second longitudinal loader and being insertable into the center hole of said disc to thereby clamp said disc; a second pair of pulleys mounted on said first longitudinal loader; a second wire laid over said second pair of pulleys; an up and down cam secured to said second wire at a rear end and engaged with said clamping spindle at a front end thereof to thereby move up and down; and a rotatable lever rotatably mounted on said player body and secured at an end to said second wire to be thereby selectively movable.

12. An automatic disc loading mechanism for a disc player comprising: a player body; turntable disc transferring means for automatically delivering a disc to said turntable and automatically delivering said disc outside of said player body, said disc transferring means including a first longitudinal loader slidable on said player body; a second longitudinal loader movably mounted on said first longitudinal loader with respect to said first longitudinal loader; retaining means mounted on said second longitudinal loader for retaining said disc; and means for moving said first longitudinal loader and said second longitudinal loader mounted thereon.

13. An automatic disc loading mechanism for a disc player comprising: a player body; a turntable; disc transferring means for automatically delivering a disc to said turntable and automatically delivering said disc outside of said player body; disc mounting means on which said disc is mountable; said disc transferring means for transferring said disc including a clamping spindle movable in substantially a vertical direction to a plane including a surface of said turntable for clamping said disc, said clamping spindle being inserted into a center hole of said disc on said disc mounting means when said disc is delivered, said disc mounting means including a second spindle insertable into said center hole of said disc mounted thereon and being movable in a vertical direction, said second spindle being movable downward by lowering said clamping spindle, retaining means for retaining said second spindle in a downward position, and means responsive to said vertical movement of said second spindle for moving said disc mounting means into and out of said player body.

* * * * *